US011338494B2

(12) United States Patent
Lhomme et al.

(10) Patent No.: US 11,338,494 B2
(45) Date of Patent: May 24, 2022

(54) METHOD FOR FORMING AND FILLING A CONTAINER BY MONITORING THE PRESSURE OF LIQUID INJECTED IN THE CONTAINER

(71) Applicant: DISCMA AG, Zürich (CH)

(72) Inventors: Franck Lhomme, Octeville sur Mer (FR); Pascal Bernier, Octeville sur Mer (FR)

(73) Assignee: Discma AG, Zurich (CH)

( * ) Notice: Subject to any disclaimer, the term of this patent is extended or adjusted under 35 U.S.C. 154(b) by 729 days.

(21) Appl. No.: 16/077,280

(22) PCT Filed: Feb. 10, 2017

(86) PCT No.: PCT/EP2017/053076
§ 371 (c)(1),
(2) Date: Aug. 10, 2018

(87) PCT Pub. No.: WO2017/137605
PCT Pub. Date: Aug. 17, 2017

(65) Prior Publication Data
US 2019/0061223 A1 Feb. 28, 2019

(30) Foreign Application Priority Data

Feb. 12, 2016 (EP) .................................... 16305166

(51) Int. Cl.
| B29C 49/06 | (2006.01) |
| B29C 49/58 | (2006.01) |
| B29C 49/78 | (2006.01) |
| B29C 49/46 | (2006.01) |
| B29C 49/12 | (2006.01) |
| B29L 31/00 | (2006.01) |

(52) U.S. Cl.
CPC .............. *B29C 49/46* (2013.01); *B29C 49/06* (2013.01); *B29C 49/12* (2013.01); *B29C 49/58* (2013.01);

(Continued)

(58) Field of Classification Search
CPC ......... B29C 49/46; B29C 49/06; B29C 49/12; B29C 49/58; B29C 49/783;

(Continued)

(56) References Cited

U.S. PATENT DOCUMENTS 9,573,314 B2    2/2017  Chauvin et al.
2011/0268855 A1* 11/2011  Chauvin .................. B65B 3/022
                                                              426/407

(Continued)

FOREIGN PATENT DOCUMENTS

CN    103260853 A    8/2013
CN    103717371 A    4/2014

(Continued)

*Primary Examiner* — Joseph S Del Sole
*Assistant Examiner* — Baileigh Kate Darnell
(74) *Attorney, Agent, or Firm* — Eric J. Sosenko; Jonathan P. O'Brien; Honigman LLP

(57) ABSTRACT

A method comprising a first injection step, wherein a first predetermined volume of pressurized liquid is injected into the preform, the predetermined volume corresponding to a fraction of the container volume, the first injection step causing an expansion of the preform into a first intermediate container. The method further comprising a second injection step, wherein, once the first predetermined volume of liquid has been injected, the liquid injection speed is reduced and the pressurized liquid is further injected in the first intermediate container until a predetermined switch pressure in the liquid injection circuit is reached, the second injection step causing an expansion of the first intermediate container into a second intermediate container, and —a third injection step starting once the predetermined switch pressure is reached, wherein the liquid injection speed is decelerated until the liquid injection is stopped.

13 Claims, 4 Drawing Sheets

(52) U.S. Cl.
CPC ...... *B29C 49/783* (2013.01); *B29C 2049/465* (2013.01); *B29C 2049/4664* (2013.01); *B29C 2049/5803* (2013.01); *B29C 2049/5875* (2013.01); *B29L 2031/7158* (2013.01)

(58) Field of Classification Search
CPC ...... B29C 2049/465; B29C 2049/4664; B29C 2049/5803; B29C 2049/5875; B29L 2031/7158
See application file for complete search history.

(56) References Cited

U.S. PATENT DOCUMENTS

| | | | |
|---|---|---|---|
| 2011/0285063 A1* | 11/2011 | Chauvin | B29C 49/46 264/525 |
| 2012/0299224 A1* | 11/2012 | Cooper | B29C 49/783 264/524 |
| 2014/0205707 A1 | 7/2014 | Chauvin et al. | |
| 2014/0300035 A1* | 10/2014 | Eberle | B29C 49/0073 264/529 |
| 2015/0075119 A1 | 3/2015 | Chauvin et al. | |

FOREIGN PATENT DOCUMENTS

| | | | | |
|---|---|---|---|---|
| CN | 105283299 A | 1/2016 | | |
| EP | 2823948 A1 | 1/2015 | | |
| JP | 2011526852 A | 10/2011 | | |
| WO | 2010003853 A1 | 1/2010 | | |
| WO | 2012/054221 A2 | 4/2012 | | |
| WO | 2012166541 A2 | 12/2012 | | |
| WO | 2014/209346 A1 | 12/2014 | | |
| WO | 2014206978 A1 | 12/2014 | | |
| WO | WO-2014209356 A1 * | 12/2014 | ............ | H04N 13/30 |
| WO | 2015004272 A1 | 1/2015 | | |

* cited by examiner

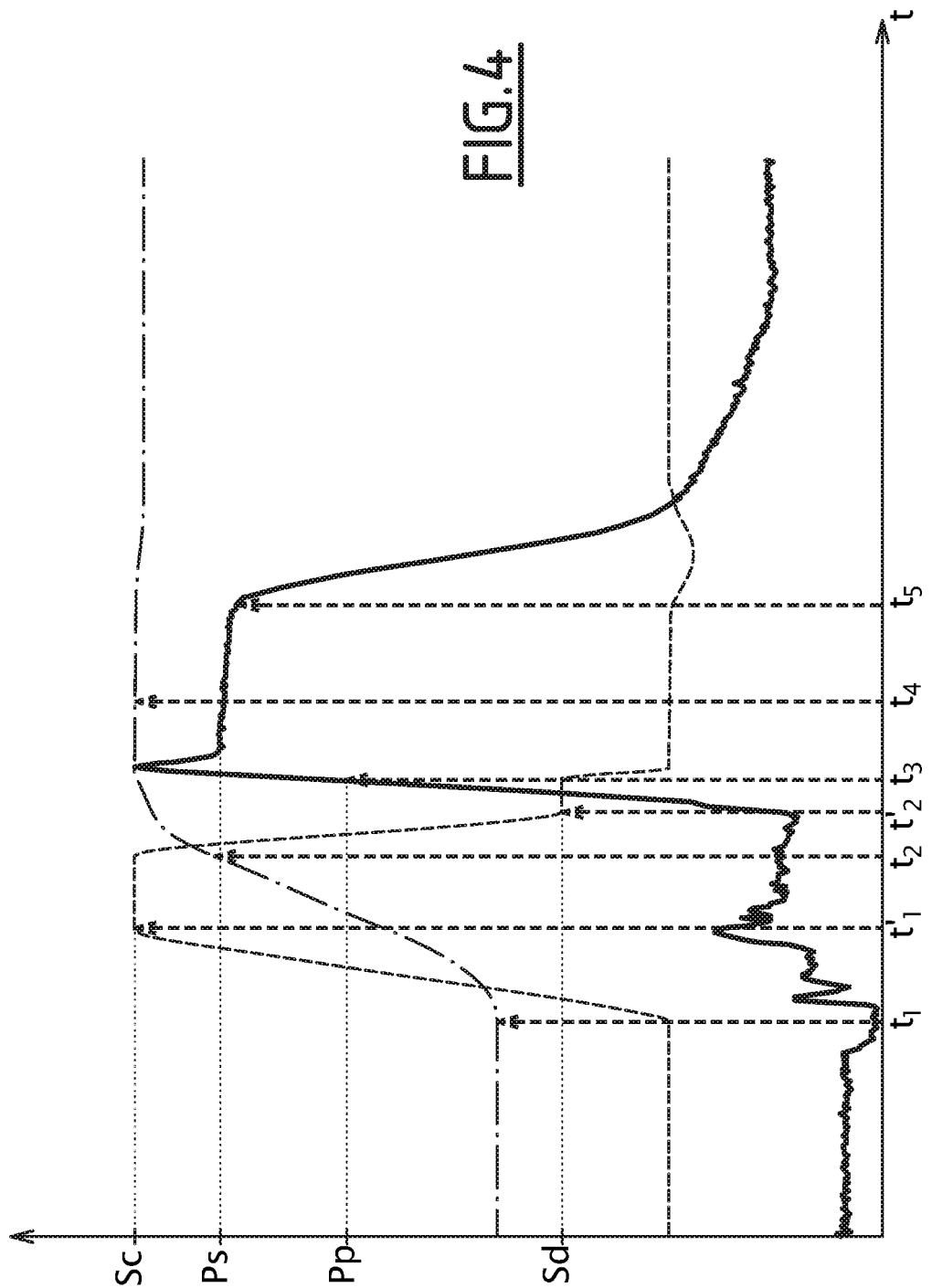

METHOD FOR FORMING AND FILLING A CONTAINER BY MONITORING THE PRESSURE OF LIQUID INJECTED IN THE CONTAINER

TECHNICAL FIELD OF THE INVENTION

The present invention relates to a method for simultaneously forming and filling a container by injecting a pressurized liquid in a preform.

The invention also relates to an injection device for simultaneously forming and filling a container by injecting a pressurized liquid in a preform according to such a method.

The invention relates to the field, known as hydroforming, of forming containers from a preform using an incompressible liquid to expand the preform.

In the application, "liquid" has a physical meaning. It designates any incompressible and able to flow medium. The liquid can have a low viscosity (like water or alcohol), a medium viscosity (like edible oil or soup), or a high viscosity (liquid detergent, soap, shampoo, ketchup, mustard). The liquid can be homogeneous or not homogeneous (including fruit pulp or bits of foodstuff), it can be Newtonian or non-Newtonian. It is not limited to foodstuff. The incompressible liquid may be for example water, or other beverages, foodstuff such as ketchup, mayonnaise, edible oil, yogurts, home or personal care products, medical fluids, fuels, hydraulic oil, operating fluids, and the like.

BACKGROUND

In the field of hydroforming, it is known to inject, using an injection device, the incompressible liquid in a heated preform made of plastic material at a pressure which is adapted to urge the wall of the preform against the wall of the molding cavity such that the preform is deformed and acquires the shape of the molding cavity and of the container to be produced.

However, it is also known that this pressure level is not sufficient to completely shape the preform into the container, meaning that, with the pressure applied to the preform, the preform acquires a shape which is not exactly the shape of the molding cavity and that an extra deformation is needed to completely urge the wall of the preform against the wall of the molding cavity. It is in particular the case when embossed letters or logos must be reproduced on the external surface of the container wall, or when the wall has ridges. Shapes having locally a very small radius of curvature are very difficult to obtain.

To this end, after the injection of liquid at a first pressure, a second pressure greater than the first pressure, is applied to the preform during a short time in order to create a pressure peak inside the preform, the pressure peak being arranged to finalize the shaping of the preform into the container.

One known method for applying the pressure peak is to use the hydraulic hammer effect obtained by injecting a liquid in a solid cavity. Indeed, at the end of the injection, the almost shaped container is relatively solid and a hydraulic hammer effect can be obtained when the liquid injection is stopped.

However, the pressure reached by with the hydraulic hammer effect is hardly controlled and may be insufficient to fully expand the container or may be too high. In the latter case, very important mechanical efforts are applied on the injection device which can damage or cause a premature wear of the injection device. Alternatively, the injection device has to be adapted to sustain the mechanical efforts due to the hydraulic hammer effect, which is not cost effective.

Furthermore, if the pressure peak is not controlled, the shape of the containers can vary from one container to the next, which is contradictory with the need of a fully reproducible process.

Additionally, the inventors have discovered that, when the injection device comprises a movable piston, controlling the course of the piston, i.e. the distance by which the piston is moved, is not an appropriate control to obtain a reproducible process. Indeed, the course of the piston may not be the same to obtain an identical container from a preform to the next. This phenomenon can be for example explained by the presence of air in the injected liquid, said air being more or less compressed during the movement of the piston, thereby modifying the distance by which the piston has to be moved to obtain the same pressure in the container and to fully expand the container.

EP 2823948 discloses a station for forming a container form a preform, comprising a main body including a preform seat adapted to receive said preform and an injection assembly, said injection assembly comprising an injection nozzle and an injection device. The injection assembly comprises maintaining means able to sustain high pressures of liquid flowing in the injection assembly.

US 2015/075119 describes a method of blowing and filling a container from a preform inside a filling and forming apparatus that comprises a mold and a pressurized liquid injection circuit able to inject a liquid under pressure inside the preform when the preform is placed inside the mold, the method comprising:

placing a preform inside the mold:

stretching the preform placed within the mold;

starting an injection phase comprising injecting a predetermined volume of liquid through the liquid injection circuit into the preform;

stopping the injection phase by stopping the injection of the liquid through the liquid injection circuit into the preform, creating an overpressure of liquid within the liquid injection circuit; and releasing the overpressure of liquid within the liquid injection circuit before the blown and filled container is released from the mold in order to evacuate or discharge the overpressure from the pressurized liquid injection circuit to avoid repeated stresses on components that are in connection with this circuit.

US 2014/205707 discloses a device for delivering a predetermined volume of beverage into a thermoplastic container formed from a heated preform, the preform being positioned in a mold, comprising an injector for injecting at least some beverage into a recess in the preform so as to promote expansion of the preform inside the mold, the mold defining the shape of the container, a member for longitudinally displacing a stretch rod over a given period and for longitudinally elongating the heated preform, the stretch rod being immobile at the end of the given period, and a member for ensuring that a volume of beverage greater than a predefined fraction of the predetermined volume is present in the recess at the end of the given period in order to increase crystallinity of the container at the end of its expansion.

One of the aims of the invention is to overcome the above-mentioned problems by proposing a method wherein the pressure peak applied to the liquid can be controlled and wherein the shape of the produced containers is identical from one container to the next.

SUMMARY OF THE INVENTION

To this end, the invention relates to a method for simultaneously forming and filling a container by injecting a pressurized liquid in a preform, said container having a container volume, the pressurized liquid being injected from a pressurized liquid source to the preform along an liquid injection circuit while the preform is in a molding cavity defining the shape of the container, the method comprising:
- a first injection step, wherein a first predetermined volume of the pressurized liquid is injected into the preform, said predetermined volume corresponding to a fraction of the container volume, said first injection step causing an expansion of the preform into a first intermediate container, wherein the method further comprises:
- a second injection step, wherein, once the first predetermined volume of liquid has been injected, the liquid injection speed is reduced and the pressurized liquid is further injected in the first intermediate container until a predetermined switch pressure in the liquid injection circuit is reached, said second injection step causing an expansion of the first intermediate container into a second intermediate container, and
- a third injection step starting once the predetermined switch pressure is reached, wherein the liquid injection speed is decelerated until the liquid injection is stopped and the second intermediate container has expanded up to said shape of the container.

The inventors have discovered that the pressure inside the injection circuit starts to significantly increase slightly before the expanding preform reaches the final shape of the container. The preform expands radially and axially when the volume of liquid injected inside the preform increases beyond the initial inner volume of the preform. An optional stretch rod can contribute to the axial stretching of the preform. The inventors have understood that when the wall of the expanding preform touches the inner surface of the molding cavity, the liquid pressure starts to increase. From that event, for an incremental increase of injected liquid volume, the portion of the preform wall having to expand for receiving said incremental volume decreases. In other words, the more the preform wall is urged against the molding cavity, the more mechanical resistance the preform opposes to the liquid injection. The phenomenon of hydraulic hammer happens only when the whole outer surface of the preform is applied in contact with the molding cavity. Such preliminary ramp up of the pressure inside the circuit is not the hammer effect itself, it is an indication that the hammer effect is likely to arrive soon. However, when a container is simultaneously formed and filled with pressurized liquid, the filling time is usually very short. In particular, when the injected liquid is colder than the vitreous transition temperature of the preform material, the goal is to fill the container as quickly as possible, and the filling time could be between 0.1 second to 0.5 second, typically about 0.2 second. That may be a reason why the state of the art did not really detect the difference between the preliminary ramp up pressure and the real peak pressure due to a well-known hammer effect.

Indeed, the devices disclosed in EP2823948, US 2015/075119 and US 2014/205707 are not adapted to control the pressure reached when the whole surface of the container is urged against the molding cavity.

The maintaining means disclosed in EP2823948 allow firmly maintaining the injection assembly in the injection position when a high pressure is reached. However, the pressure inside the container is not controlled.

The method described in US 2015/075119 comprises a step wherein an overpressure is reached and then evacuated. Consequently, the pressure inside the container is not controlled.

The device described in US 2014/0205707 is a filler in which a container is formed from a preform before being filled with a liquid. It is then not adapted to simultaneously form and fill a container by injecting a pressurized liquid in a preform.

The inventors have additionally discovered that it is possible to take advantage of said preliminary increase of pressure by strongly reducing the injection speed slightly before said preliminary increase of pressure is likely to happen. The inventors have discovered a surprising effect of combining:
- a first injection step allowing a full speed injection,
- a second injection step reducing the injection speed before the time period where the preliminary increase of pressure is likely to happen,
- detecting when the pressure inside the injection circuit reaches a predetermined switch pressure as to immediately switch to a third injection step allowing, before the hammer effect happens, to start the process of stopping the injection.

The time where the pressure inside the injection circuit reaches a predetermined switch pressure may strongly vary from a container to another, depending of numerous factors like outside temperature, air dissolved into the injected liquid, variation of cavity dimensions, size of the molding cavity etc. However, the inventors have discovered that initiating the process of stopping the injection before the hammer effect happens allows controlling the pressure reached when the whole surface of the container is urged against the molding cavity. It is possible to fully master the pressure peak and to obtain at the end of the method identical containers in shape and volume. According to another feature of the method according to the invention, the second injection step comprises a survey period during which the liquid injection speed is constant and the pressure inside the injection circuit is measured and compared to said predetermined switch pressure, and the method comprises driving liquid pressurizing means such that the liquid is injected from a starting time and during the first and second injection steps according to a main predetermined curve of injection speed or injected volume over time, and such that the injected speed from a switching time and during said third injection step follows a final predetermined curve of injection speed or injected volume over time.

Such "driving according to a predetermined curve of injection speed or injected volume" may be an open loop control, for example, when the pressurizing means include a piston, a rotating servomotor and a rotation/translation converting mechanism. Such "driving according a predetermined curve of injection speed or injected volume" may alternatively be a closed loop control, using a return signal correlated to the real injection speed or injected volume, like using a measurement of a piston position. In both alternative, the fact to drive the injection by controlling the injection speed or injected volume is much more stable and secure than driving by controlling the injected pressure. As illustrated in FIG. 4, the liquid pressure before reaching said switch pressure is rather erratic and depends of many factors like the synchronization of the injecting speed and the stretch rod speed. In the present embodiment the pressurizing means are 100% driven by Speed or Volume control (and not pressure control), before and after the switch of the "curve of injection speed or injected volume over the time". According to another feature of the method according to the invention, the second injection step comprises a decelerating step wherein the liquid injection speed is decreased until said liquid injection speed reaches the constant liquid injection speed, said decelerating step occurring until a second predetermined volume of liquid is injected, said second predetermined volume being comprised between the predetermined volume and the container volume.

Having a phase wherein liquid is injected at a constant speed allows an easier transition between the second and the third injection step. For example, the starting point of the final predetermined curve of injection speed over time is said constant speed at the time where the liquid pressure reaches said predetermined switch pressure. According to another feature of the method according to the invention, the method comprises a maintaining period extending at an end portion of the third step, the pressure applied in the liquid injection circuit during said maintaining period being a setpoint pressure, the predetermined switch pressure corresponding to a fraction of said setpoint pressure.

This fraction is determined in order to be above the pressure reached during the erratic phase of the pressure and early enough to allow avoiding the pressure when the hammer effect occurs increasing too much above the setpoint pressure.

The maintaining step allows applying the wanted pressure during a sufficient time to fully expand the container and make sure that the details of the molding cavity, if such a molding cavity is provided, are correctly engraved in the container. Setting the predetermined switch pressure as a fraction of the maintaining pressure makes it possible to stop the injection precisely when the maintaining pressure is reached such that the maintaining pressure is properly controlled.

According to another feature of the method according to the invention, the predetermined switch pressure is substantially comprised between 50% and 75% of the setpoint pressure.

The fraction of the setpoint pressure depends on the speed of the liquid injection at which the pressure inside the injection circuit has to reach said predetermined switch pressure.

According to other features of the method according to the invention:
- the pressurized liquid source comprises a pressurizing device comprising a movable piston, the liquid injection being controlled by the movement of said piston, the liquid injection speed being controlled by controlling the speed of the piston;
- the first predetermined volume is detected by monitoring the position of the piston.

Monitoring the position of the piston before the third injection step allows precisely controlling the volume of injected liquid since said volume depends from the position of the piston. According to other features of the method according to the invention:
- the first predetermined volume is comprised between 50% and 85% of the container volume, preferably between 70% and 80% of the container volume, for example about 75% of the container volume;
- the first injection step comprises an initial injection phase, wherein the pressurized liquid is injected at an increasing injection speed, and a constant injection phase, wherein the pressurized liquid is injected at a constant injection cruise speed, until the predetermined volume is reached;
- the increase in the injection speed of the initial injection phase is equal to the highest liquid acceleration possible.

Such highest acceleration possible is determined by the limit of the hardware used for generating the pressure and/or by the load losses inside the liquid circuit. According to another feature of the method according to the invention, the pressure in the liquid injection circuit is monitored by a pressure sensor placed in said liquid injection circuit.

The invention also relates to an injection device for implementing a method as described above, comprising a molding cavity, a pressurized liquid source and an injection nozzle in fluidic communication with the pressurized liquid source, said injection nozzle being arranged to be placed in fluidic communication with a preform in said molding cavity, said injection nozzle defining with said pressurized liquid source and said preform a liquid injection circuit, said injection device comprising volume measuring means for measuring the volume of liquid injected in the preform from the pressurized liquid source and pressure measuring means for measuring the pressure in the liquid injection circuit.

According to other features of the injection device:
- the device comprises driving means for driving the pressurized liquid source, said driving means being connected to said pressure measuring means and connected to a software memory including a main curve of injection speed over time, and a final curve of injection speed over time, said driving means being of a closed loop type based on a return signal of the measured injected volume and/or of the measured injection speed.
- the pressurized liquid source comprises a pressurizing device comprising a piston moved within a piston body by a servo motor, said volume measuring means including a sensor of the piston position,
- the pressure in the liquid injection circuit is monitored by a pressure sensor placed in said liquid injection circuit.

BRIEF DESCRIPTION OF THE DRAWINGS

Other aspects and advantages of the invention will appear upon reading the following description, given by way of example and made in reference to the appended drawings, wherein:

FIG. 4 is a graph representing the position of the piston over time in a mixt line, the speed of the piston over time in a dashed line and the pressure in the injection circuit over time in hard line.

DETAILED DESCRIPTION OF THE INVENTION

The method according to the invention can be implemented in a regular injection device adapted for a hydroforming method and having appropriate control and monitoring means.

Figure 1:
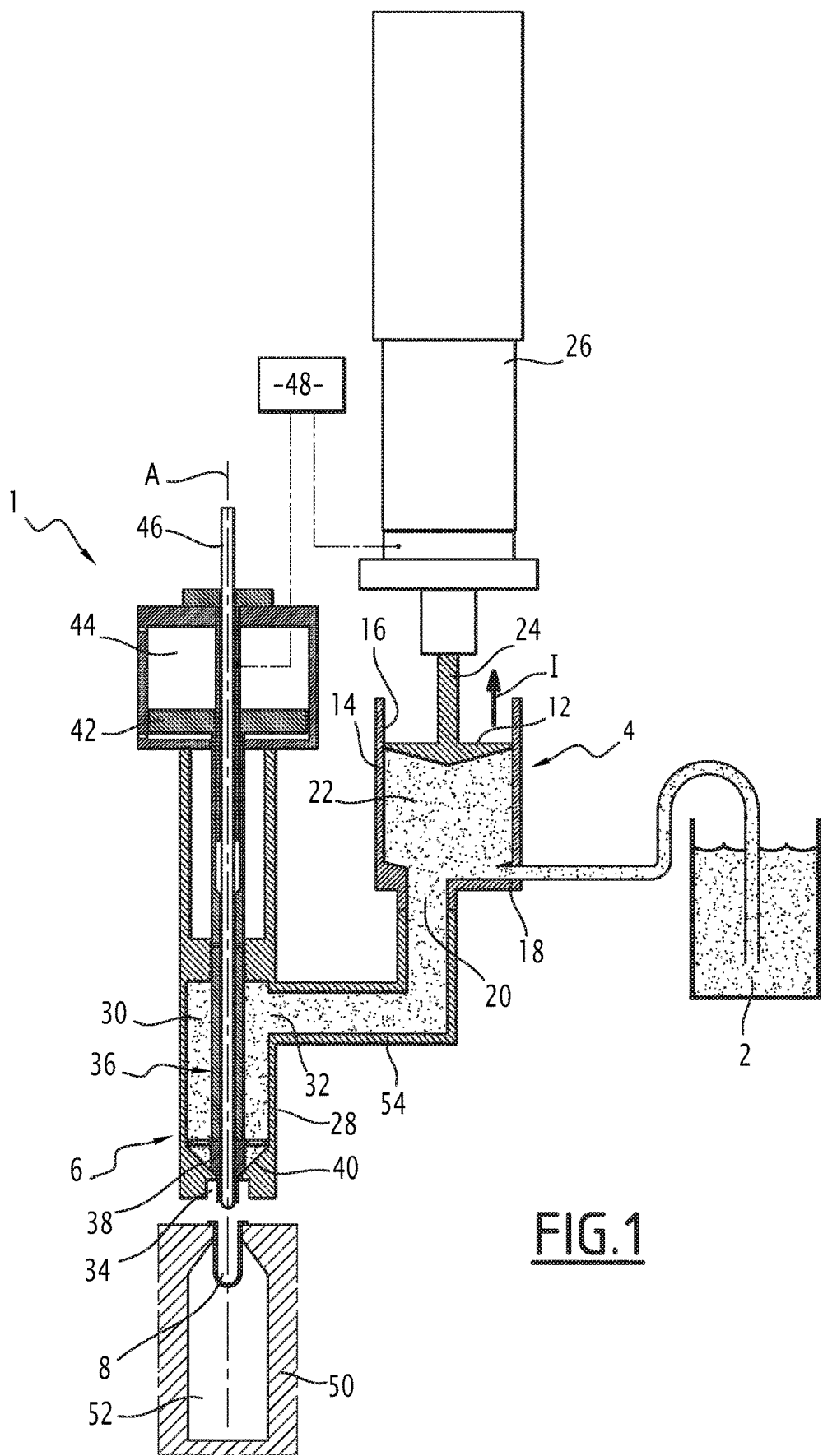
FIG. 1 is a cross-section view on an injection device allowing to implement the method according to the invention.

An example of such an injection device 1 is shown in FIG. 1. The injection device 1 comprises a liquid source 2, a pressurizing device 4 and an injection nozzle 6.

Figure 3:
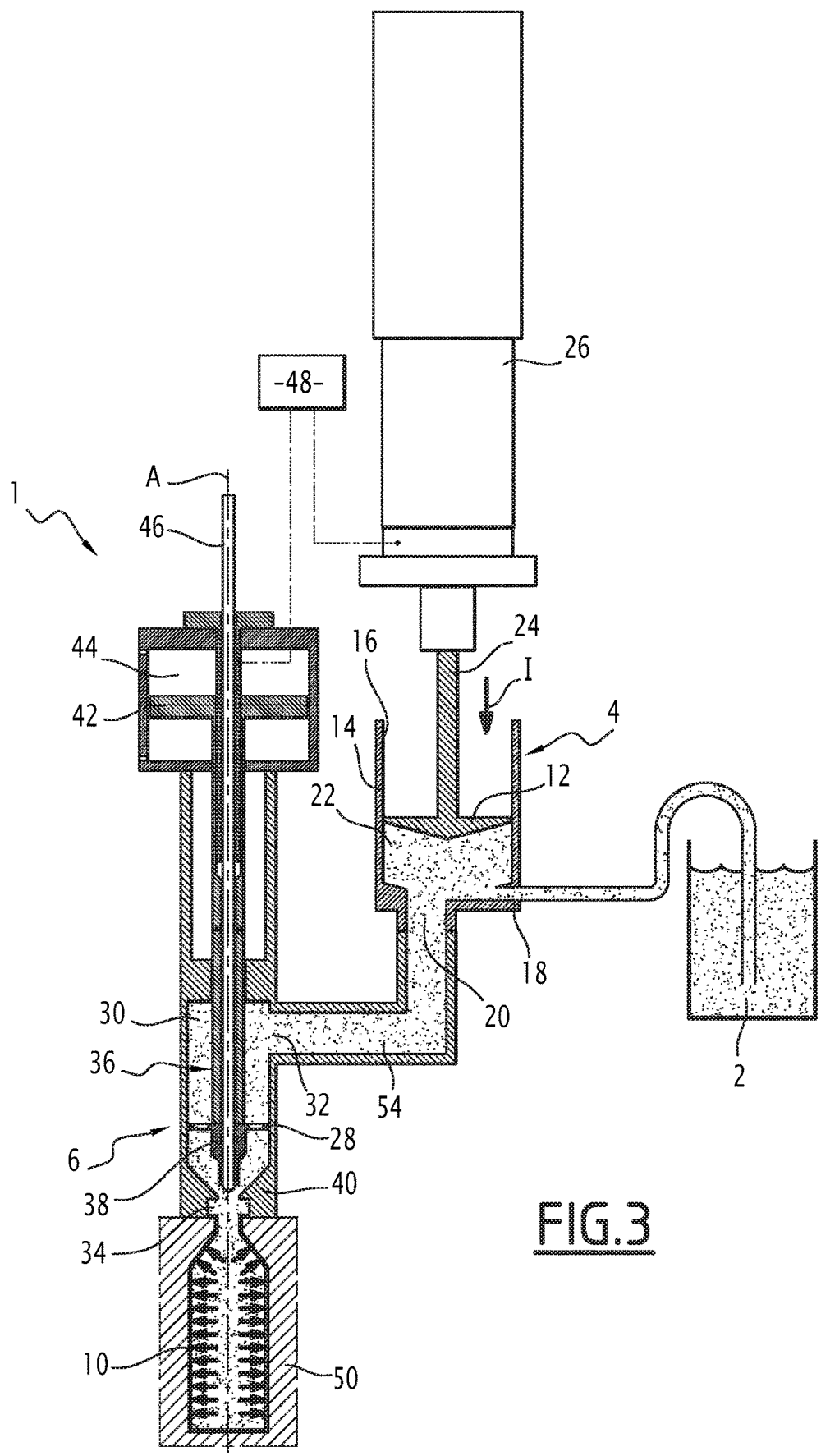
FIG. 3 is a cross-section view of the injection device of FIG. 1 at during the method of the invention.

The liquid source 2 contains a liquid to be injected in a preform 8 to expand said preform into a container 10 (FIG. 3). The liquid is advantageously the end product, i.e. a liquid that is intended to remain in the container 10 to be delivered to a final consumer. As explained previously, the liquid can be of any appropriate nature.

The liquid source 2 is in fluidic communication with the pressurizing device 4, for example via appropriate tubing, which is arranged to inject the liquid into the preform 8 through the injection nozzle 6 at a controllable pressure and speed.

To this end, the pressurizing device 4 is advantageously a piston device comprising a movable piston 12 movable inside a piston body 14. The piston body 14 comprises a cylindrical wall 16 comprising an inlet 18 and an outlet 20 opening into a pressurizing chamber 22 defined by the piston 12 and the cylindrical wall 16. The liquid source 2 is placed in fluidic communication with the pressurizing chamber 22 via the inlet 18 and the injection nozzle 6 is placed in fluidic communication with the pressurizing chamber 22 via the outlet 20. The movable piston 12 is movable inside the piston body 14 such that the volume of the pressurizing chamber 22 is variable depending on the position of the piston 12 in the piston body 14. More particularly, the piston 12 is movable between a full position, shown in FIG. 1, wherein the piston 12 is spaced from the outlet 20 and the volume of the pressurizing chamber 22 is the highest, and an injection position, shown in FIG. 3, wherein the piston 12 is brought closer to the outlet 20 and the volume of the pressurizing chamber is the lowest. The piston 12 moves according to an injection direction between the full position and the injection position, said injection direction being shown by arrow I in FIGS. 2 and 3. It should be noted that the piston 12 is in liquid tight contact with the cylindrical wall 16 of the injection body 14 to prevent any liquid leaking past the piston 12 out of the injection chamber 22.

The movement of the piston is actuated by appropriate actuation means, for example comprising an actuation rod 24, attached to the piston 12, and a servomotor 26 arranged to move the actuation rod 24 and the piston 12 in translation in the injection direction and in a direction opposite the injection direction, called the filling direction, as shown by arrow F in FIG. 1.

Figure 2:
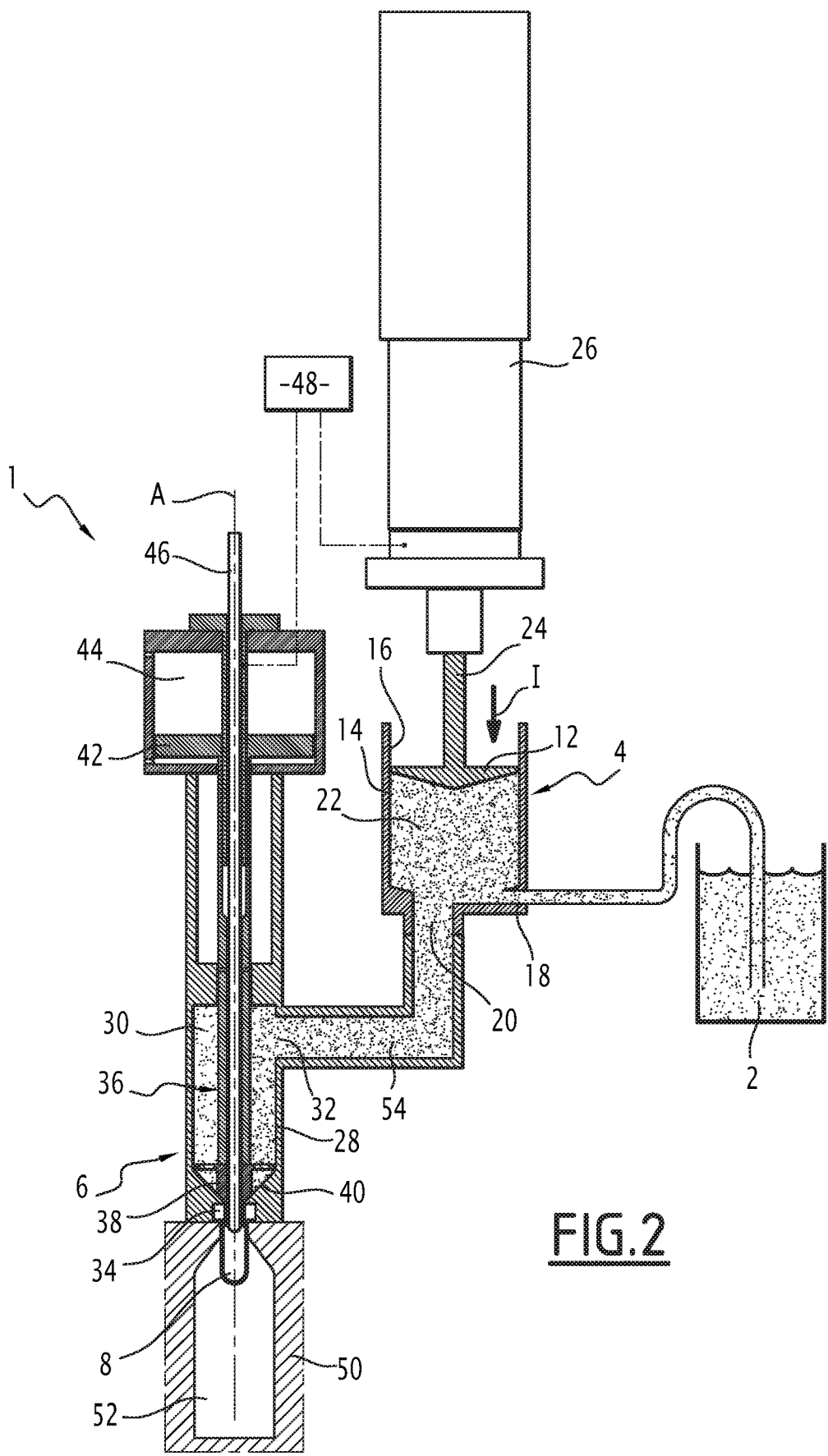
FIG. 2 is a cross-section view of the injection device of FIG. 1 at an initial step of the method.

The injection nozzle 6 comprises a nozzle body 28 defining a nozzle chamber 30 placing in fluidic communication an inlet 32 with an outlet 34. The inlet 32 is placed in fluidic communication with the outlet 20 of the pressurizing device 4 via appropriate tubing. The outlet 34 is arranged to be placed in fluidic communication with the inner volume of the preform 8 in a liquid tight manner, as shown in FIGS. 2 and 3.

It should be noted that the injection nozzle 6 can be movable between a retracted position (FIG. 1), wherein a preform 8 can be placed under the outlet 34 and a container 10 can be retrieved from under the outlet 34, and an injection position (FIGS. 2 and 3), wherein the outlet 34 is placed in fluidic communication with the inner volume of the preform 8.

A seal pin 36 extends in the nozzle chamber 30 and is movable in said nozzle chamber 30 between a sealing position (FIGS. 1 and 2), wherein a sealing end 38 of the seal pin 36 cooperates with a complementary portion 40 of the nozzle chamber 30 in a fluid tight manner to prevent liquid present in the nozzle chamber 30 to flow through the outlet 34, and a opened position (FIG. 3), wherein the sealing end 38 of the seal pin 36 is spaced from the complementary portion 40 such that liquid can flow through the outlet 34. By complementary portion 40, it is meant that a part of the nozzle chamber 30 has a shape complementary to the shape of the sealing end 38 of the seal pin 36. This complementary portion 40 extends for example in the immediate vicinity of the outlet 34. The movement of the seal pin 36 is for example controlled by an actuation piston 42 placed in an upper chamber 44 of the injection nozzle 6 and attached to the seal pin 36. In a known manner, by using an actuation fluid, for example air, in the upper chamber 44, it is possible move the seal pin 36 between its sealing position and its closed position.

The seal pin 36 can be hollow to receive a stretch rod 46 extending through the seal pin 36 along an injection axis A. In a known manner, the stretch rod 46 is movable in translation through the seal pin 36 and through the outlet 34 to assist in the axial expansion of the preform 8 as will be described subsequently. The movement of the stretch rod 46 is controlled by appropriate actuation means (not shown), such as a servo motor or magnetic means or other means.

The injection device 1 further comprises a control unit 48 arranged to control the actuation means of the injection device to control and synchronize the movements of the movable piston 12, of the seal pin 36 and of the stretch rod 46.

The injection device 1 further comprises sensor means that will be described subsequently, in conjunction with the method of the invention.

The injection device 1 described above can be used with a mold 50 defining a molding cavity 52 having a shape complementary to the shape of the container 10 to be produced. As known per se, the mold 50 is arranged to receive the preform 8 such that the inner volume of said preform 8 remains accessible to be placed in fluidic communication with the outlet 34.

A method for simultaneously forming and filling a container 10 by injecting a pressurized liquid in a preform 8 will now be described, with more particular reference to FIG. 4. The method is implemented in an injection device 1 as described above, wherein the space comprising the pressurizing chamber 22, which forms a pressurized liquid source, the tubing connecting the outlet 20 of the pressurizing chamber 22 to the inlet 32 of the nozzle chamber 30, the nozzle chamber 30, the outlet 34 and the inner volume of the preform 8 is referred to as the liquid injection circuit 54.

First, a heated preform 8 is placed in the molding cavity 52 of the mold 50 as shown in FIG. 1. By heated, it is meant that the preform 8, for example made of PET (polyethylene terephthalate), is heated above its glass transition temperature such that the preform 8 is in a malleable state in the molding cavity 52.

Next, the injection nozzle 6 is placed in its injection position, as shown in FIG. 2, such that the outlet 34 is placed in fluid communication with the inner volume of the preform 8.

At this stage, the seal pin 36 is in its sealing position and prevents liquid from flowing though the outlet 34. It should be noted that in this position, the liquid injection circuit 54 is filled with liquid coming from the liquid source 2 and pressurized by the movable piston 12. In order to do so, the movable piston 12 is moved in the filling direction F from its injection position such that liquid is drawn from the liquid source 2 into the liquid injection circuit 54 and the movable piston 12 is then moved in the injection direction I to pressurize the liquid while the seal pin 36 is in its sealing position. A non-return valve placed in the tube between the liquid source 2 and the pressurizing chamber 22 for example prevents liquid to return to the liquid source 2 during this operation. By pressurizing, it is meant that the liquid is brought to a pressure above the atmospheric temperature. For example, just before the opening of the seal pin 36, the pressure could be between 1 and 2 bar.

Liquid is then injected in the preform 8 by moving the seal pin 36 to its injection position and by moving the movable piston 12 in the injection direction I, as shown in FIG. 3, which expands the preform 8 and urges the wall of the preform 8 towards the wall of the molding cavity 52 as represented by the arrows in the container 10 of FIG. 3.

Before and/or during this injection of liquid, the stretch rod 46 can be moved to contact the bottom of the preform 8 and to exert a stretching force on said bottom such that the preform is expanded along the injection axis A, as known per se.

The liquid injection comprises several steps which will now be described.

In FIG. 4, the position of the piston 12 is represented in mixt lines; the speed of the piston 12 is represented in dashed line and reports to an "S" vertical axis; and the pressure of the liquid inside the injection circuit 54 (visible in FIG. 1) is represented in integral line and reports to the "P" vertical axis.

At the start of the injection, i.e. when the seal pin 36 is moved to its injection position, a first injection step starts wherein the preform 8 is expanded up to a first intermediate container having a volume corresponding to a fraction of the volume of the final container 10 to be produced, also called container volume. In other words, the first intermediate container is a not fully expanded container. To form this first intermediate container, a first predetermined volume of liquid is injected in the preform 8 by moving the injection piston 12 in the injection direction. Said start of the injection is represented by arrow $t_1$ in FIG. 1.

The first predetermined volume of liquid is equal to a fraction of the container volume, for example comprised between 40% and 90% of the container volume, preferably comprised between 50% and 75% of the container volume. According to an embodiment, the predetermined volume is 75% of the container volume. According to another embodiment, the predetermined volume is 50% of the container volume.

The injected volume can be controlled by controlling the position of the movable piston 12 in the piston body 14. Indeed, the distance by which the piston 12 is moved in the injection direction I in the piston body 14 while the seal pin 36 is in the injection position, corresponds to an amount of liquid injected in the preform 8. Consequently, controlling the position of the piston 12 allows an accurate control of the volume of pressurized liquid injected in the preform 8. Consequently, the injection device comprises means to monitor and control the position of the piston 12 in the piston body 14. Such means are for example coupled to the servomotor 26 driving the piston 12 and to the control unit 48.

These means are arranged such that when a predetermined position of the piston 12 corresponding to the predetermined volume of pressurized liquid injected in the preform 8 is reached, a second injection step begins wherein the behaviour of the piston 12 changes, as will be described subsequently.

The predetermined position of the piston 12 corresponding to the predetermined volume of pressurized liquid injected in the preform 8 is represented by arrow $t_2$ in FIG. 4. One can see that, between time $t_1$ and time $t_2$, the value of the position of the piston has increased relative to the initial value of the position before time t1. The initial value corresponds to the position of the piston 12 in the full position shown in FIG. 1 and the value of the position increases as the piston 12 is moved toward the injection position, i.e. as the piston 12 is brought closer to the outlet 20 of the piston body 14. This means that between time $t_1$ and time $t_2$, the piston 12 has moved from its full position to an intermediate position between the full position and the injection position, said intermediate position being reached when the predetermined volume of pressurized liquid has been injected in the preform 8.

The method also involves monitoring and controlling the speed of displacement of the piston 12 in the piston body via appropriate means also coupled to the servomotor 26 and to the control unit. The speed of the piston is shown in dashed lines in FIG. 4.

As can be seen in FIG. 4, during the first injection step, i.e. at a time $t_1'$ between time $t_1$ and time $t_2$, the speed of the piston 12 first increases rapidly and then is constant between time $t_1'$ and time $t_2$ where the intermediate position of the piston 12 is reached.

The increase in the speed of the piston 12 corresponds to an initial injection phase during which the movement of the piston 12 is accelerated to rapidly reach a cruise speed Sc. The acceleration is arranged to be the most important possible with the injection device 1 of the invention. This means that the increase in the injection speed of the initial injection phase is equal to the highest liquid acceleration possible in the injection circuit, meaning that the increase of the injecting liquid flow speed is the maximum increase that can be generated by the actuator of the piston 12. For example, if the actuator is an electric motor or a servo motor, the maximum is determined by the maximum current just before the security cut off. In other words, the aim of the initial phase is to reach the cruise speed Sc as fast as possible, such that the piston 12 moves at the cruise speed Sc for most of the first injection step. The acceleration is for example around 1G or 2G depending on the energy that can be consumed for this operation.

Moving the piston 12 at a constant speed equal to the cruise speed Sc allows a better control of the synchronization of the movement of the piston 12 with the movement of the stretch rod and or with other parts of the injection device. Furthermore, the movement at a constant speed eases the detection of the intermediate position of the piston 12, i.e. the determination of time $t_2$.

At time $t_2$, a second injection step begins during which the pressure inside the liquid injection circuit 54 is monitored such that a predetermined switch pressure Pp inside the liquid injection circuit 54 can be detected at time $t_3$, where a third injection step begins as will be described subsequently.

The predetermined switch pressure Pp to be detected is equal to a fraction of a setpoint pressure Ps that has to be applied to the container at the end of the method and arranged to fully and properly impart the shape of the molding cavity on the container 10. Such a setpoint pressure Ps allows obtaining a completely formed container in particular when local details, such a ridges or ribs, has to be imprinted in the container. The setpoint pressure Ps substantially corresponds to the pressure peak that has to be applied to the container and which is greater than the pressure applied to the preform during the first injection step and at the beginning of the second injection step, as can be seen in FIG. 4, wherein the pressure inside the liquid injection circuit 54 is shown in hard line. As an example, the pressure applied during the first injection step and at the beginning of the first step is around 1 to 2 bar and the setpoint pressure Ps may be around 40 bar.

As explained previously, the predetermined switch pressure Pp is a fraction of said setpoint pressure Ps, which is chosen depending on a speed of the piston 12 during the second injection step and at which the predetermined switch pressure Pp is to be detected as will now be explained.

During the second injection step, the speed of the piston 12 is decreased until it reaches a detection speed Sd inferior to the cruise speed Sc. To this end, the second injection step comprises a step of decelerating the piston 12 until it reaches the detection speed Sd at time $t_2'$ and then maintaining the speed of the piston 12 at a constant speed equal to the detection speed Sd until the predetermined switch pressure Pp is reached at time $t_3$.

The deceleration is also the highest deceleration that the piston can be subjected to with the injection device such that the detection speed Sd is reached as fast as possible. In fact, the detection speed has to be reached at a time when the pressure inside the liquid injection circuit 54 starts to increase rapidly, i.e. when the volume of liquid injected inside the container is close to the container volume that has to be reached. Indeed, during the second injection step, the first intermediate container is further expanded into a second intermediate container having a volume greater than the volume of the first intermediate container and close to the container volume. Before the volume of the second intermediate container is reached, the expansion of the container is reduced and, as liquid is further injected into the container, the pressure raises rapidly inside the liquid injection circuit 54.

The aim of the invention is to detect the predetermined switch pressure Pp in order to modify the behavior of the piston when said predetermine pressure is reached, as will be described subsequently. However, the predetermined switch pressure is located in this rapid pressure rise as shown in FIG. 4, which makes it difficult to detect. One way of being able to detect this predetermined switch pressure Pp is to reduce the speed of the piston 12 during the second injection step such that the pressure rise is not too steep. Indeed, if the speed of the piston was to be maintained at the cruise speed Sc, the pressure rise would be very steep, i.e. almost vertical in the graph of FIG. 4, and the detection of the predetermined switch pressure would not be possible, whereas, when the piston 12 moves at the detection speed Sd, which is inferior to the cruise speed Sc, and which is constant once it is reached, the predetermined switch pressure is detectable. The predetermined switch pressure can be detected by a pressure sensor placed in the liquid injection circuit 54 or by monitoring a current signal of the motor driving the movable piston, for example the servomotor 26.

The increase of pressure inside the liquid injection circuit starts when the intermediate container has a volume substantially comprised between 90% and 95% of the container volume. Consequently, the deceleration of the piston 12 at the beginning of the second injection step is arranged such that the detection speed Sd is reached when the volume of liquid injected in the intermediate container is substantially comprised between 90% and 95% of the container volume, for example when said volume is equal to 94% of the container volume.

The piston 12 is then moved at a constant speed equal to the detection speed Sd until the predetermined switch pressure is detected at time $t_3$, where the third injection step begins.

When the detection speed Sd is substantially equal to 100 mm/s, the predetermined switch pressure Pp is set to be equal to 50% of the setpoint pressure Ps. When the detection speed is substantially equal to 50 mm/s, the predetermined switch pressure Pp is set to be equal to 75% of the setpoint pressure Ps. This is because, once the predetermined switch pressure Pp is reached, the injection device has to be able to further decrease the speed of the piston rapidly during the third injection step to master the pressure peak that will occur during this third injection step.

As mentioned above, at time $t_3$, the third injection step begins and the speed of the piston is further decreased until said speed is equal to 0 and the piston no longer moves in the injection position, i.e. until the piston reaches the injection position shown in FIG. 3. In this position, the liquid injection is stopped, meaning that no further amount of liquid enters the container 10.

A hydraulic hammer effect then occurs wherein the pressure exceeds the setpoint pressure Ps. However, thanks to the method of the invention, this hammer effect is not too important and can be sustained by the injection device, without the need of a particular oversizing of the injection device. After the hydraulic hammer, the pressure then settles to the setpoint pressure Ps, at which the container is completely applied against the wall of the molding cavity 52 and at which the shape of the container is properly defined. Consequently, at the end of the third step, the second intermediate container has expanded into the final container.

The principle of the invention is therefore to control the application of the setpoint pressure Ps by monitoring the pressure of the liquid inside the liquid injection circuit 54 at the end of the expansion of the container, rather than by monitoring the position of the piston, as it is conventionally done. By doing so, one makes sure that the setpoint pressure Ps is applied to the container, which is not the case when the position of the piston is monitored since the position of the piston when the setpoint pressure is reached can vary from one container to the next, for example depending on the amount of air that is compressed in the liquid injection circuit 54 and which can vary from one container to the next.

Consequently, the method of the invention makes it possible to apply the same setpoint pressure Pp to all the containers produced by the injection device. The containers produced by the method are therefore uniform and the method is fully reproducible.

According to an embodiment, the method of the invention further comprises a maintaining step after the third injection step, said maintaining step starting at time $t_4$. During this maintaining step, the piston is maintained in the injection position such that the setpoint pressure is applied in the liquid injection circuit 54 and in the container for a predetermined amount of time, ending at time $t_5$. This maintaining step allows applying the wanted pressure during a sufficient time to fully expand the container and make sure that the details of the molding cavity, if such a molding cavity is provided, are correctly engraved in the container.

Once the maintaining step is over, the seal pin 36 is moved back in its sealing position and the formed container can be retrieved from the mold 50.

The method can then be applied to a subsequent preform 8.

The method of the invention has been described in conjunction with the use of a piston to pressurize and inject the liquid, the speed of the piston allowing to control the speed of liquid injection. However, the pressurized liquid source could also be formed by a pump. In this case, the liquid injection speed and the injected liquid volume are controlled by controlling the pump. The method remains the same, the control of the volume being replaced by the control of the pressure once the container is almost fully expanded in order to master the pressure peak to be applied to the container.

The invention claimed is:

1. A method for simultaneously forming and filling a container by injecting a pressurized liquid in a preform, the container having a container volume, the pressurized liquid being injected from a pressurized liquid source to the preform along an liquid injection circuit while the preform is in a molding cavity defining the shape of the container, the method comprising:
   a first injection step injecting a first predetermined volume of the pressurized liquid into the preform at an injection speed, the first predetermined volume corresponding to a fraction of the container volume, the first injection step causing an expansion of the preform into a first intermediate container,
   a second injection step starting once the first predetermined volume of liquid has been injected, the second injection step including reducing the liquid injection speed relative to the liquid injection speed of the first injection step and injecting the pressurized liquid into the first intermediate container until a predetermined switch pressure in the liquid injection circuit is reached, the second injection step causing an expansion of the first intermediate container into a second intermediate container, and
   a third injection step starting once the predetermined switch pressure is reached, the third injection step including decelerating the liquid injection speed from the second injection step until liquid injection is stopped and the second intermediate container has expanded into the shape of the container.

2. The method according to claim 1, wherein the second injection step comprises a survey period during which the liquid injection speed is a constant liquid injection speed and pressure inside the injection circuit is measured and compared to the predetermined switch pressure, and
   wherein the method further comprises injecting the pressurized liquid from a starting time and during the first and second injection steps according to a main predetermined curve of injection speed or injected volume over time, and such that the liquid injection speed during the third injection step follows a final predetermined curve of injection speed or injected volume over time.

3. The method according to claim 2, wherein during the second injection step the liquid injection speed is reduced until the liquid injection speed reaches the constant liquid injection speed, the second injecting step occurring until a second predetermined volume of liquid is injected, the second predetermined volume being being a volume between the predetermined volume and the container volume.

4. The method according to claim 1, further comprising a maintaining period at an end portion of the third injection step, applying pressure in the liquid injection circuit during the maintaining period at a setpoint pressure, the predetermined switch pressure corresponding to a fraction of the setpoint pressure.

5. The method according to claim 4, wherein the predetermined switch pressure is between 50% and 75% of the setpoint pressure.

6. The method according to claim 1, wherein the pressurized liquid source comprises a pressurizing device having a movable piston, the first, second and third injection steps being controlled by movement of the piston and the liquid injection speed being controlled by controlling movement speed of the piston.

7. The method according to claim 6, wherein the first predetermined volume is detected by monitoring the position of the piston.

8. The method according to claim 1, wherein the first predetermined volume is between 50% and 85% of the container volume.

9. The method according to claim 1, wherein the first injection step includes an initial injection phase during which the pressurized liquid is injected at an increasing injection speed, and includes a constant injection phase during which the pressurized liquid is injected at a constant injection cruise speed, until the first predetermined volume is reached.

10. The method according to claim 9, wherein the increasing injection speed during the initial injection phase is equal to a highest liquid acceleration during the method.

11. The method according to claim 1, wherein the pressure in the liquid injection circuit is monitored by a pressure sensor placed in the liquid injection circuit.

12. The method according to claim 1, wherein the first predetermined volume is between 70% and 80% of the container volume.

13. The method according to claim 1, wherein the first predetermined volume is substantially 75% of the container volume.

* * * * *